(12) United States Patent
Wang

(10) Patent No.: US 11,663,641 B2
(45) Date of Patent: May 30, 2023

(54) INTUITIVE CUSTOMIZATION SYSTEM

(71) Applicant: Customized Technology Co., Ltd., Taichung (TW)

(72) Inventor: Shui-Mu Wang, Taichung (TW)

(73) Assignee: Customized Technology Co., Ltd., Taichung (TW)

( * ) Notice: Subject to any disclaimer, the term of this patent is extended or adjusted under 35 U.S.C. 154(b) by 234 days.

(21) Appl. No.: 17/170,859

(22) Filed: Feb. 8, 2021

(65) Prior Publication Data
US 2022/0164846 A1    May 26, 2022

(30) Foreign Application Priority Data

Nov. 25, 2020   (TW) .................................. 109141293

(51) Int. Cl.
| | |
|---|---|
| *G06Q 30/0601* | (2023.01) |
| *H04L 67/75* | (2022.01) |
| *G05B 19/4097* | (2006.01) |
| *G06F 3/0482* | (2013.01) |
| *H04L 67/12* | (2022.01) |

(52) U.S. Cl.
CPC ..... *G06Q 30/0621* (2013.01); *G05B 19/4097* (2013.01); *G06F 3/0482* (2013.01); *H04L 67/12* (2013.01); *H04L 67/75* (2022.05); *G05B 2219/33125* (2013.01); *G05B 2219/35012* (2013.01)

(58) Field of Classification Search
CPC ............. G06Q 20/0621; G06Q 10/083; G06Q 30/0633; G06Q 30/0643; G06Q 30/0621; G06F 16/9535; G06F 16/9558; G06F 3/04817; G06F 3/0482; G06F 3/04842
See application file for complete search history.

(56) References Cited

U.S. PATENT DOCUMENTS

| | | | |
|---|---|---|---|
| 2012/0109777 A1* | 5/2012 | Lipsitz | G06Q 30/0621 705/26.5 |
| 2013/0173415 A1* | 7/2013 | Harvill | G06Q 30/0621 705/26.5 |

(Continued)

FOREIGN PATENT DOCUMENTS

| | | |
|---|---|---|
| JP | 2002-189844 A | 7/2002 |
| JP | 2002-269411 A | 9/2002 |

(Continued)

*Primary Examiner* — William L Bashore
*Assistant Examiner* — Gregory A Distefano
(74) *Attorney, Agent, or Firm* — Winston Hsu

(57) ABSTRACT

An intuitive customization system includes a server unit, a display device, an interface unit and a manufacturing station. The server unit is signally connected to an internet. The display device is signally connected to the server unit. The interface unit is displayed on the display device. The interface unit includes a working window frame, a first base image, a first part image and a first pattern menu. The first pattern menu comprises P first patterns. When a user selects one of the P first patterns of the first pattern menu, the first part image displays a first customized pattern, and the first customized pattern represents the one of the P first patterns. A first user design includes the first base image, the first part image and the first customized pattern. The manufacturing station manufactures a finished product according to the first user design.

16 Claims, 15 Drawing Sheets

(56) References Cited

U.S. PATENT DOCUMENTS

2015/0366293 A1* 12/2015 Clarkson ............ A43B 23/0205
                                                                                             703/1
2017/0270224 A1*  9/2017 Singh ................ G06Q 30/0621
2018/0293632 A1  10/2018 Golub
2019/0108568 A1   4/2019 Liao
2020/0152315 A1*  5/2020 Shtirberg ............... A61B 34/20

FOREIGN PATENT DOCUMENTS

| TW | M503623 U | 6/2015 |
|---|---|---|
| TW | 201915718 A | 4/2019 |
| TW | 202008247 A | 2/2020 |
| WO | 2011/002787 A1 | 1/2011 |

* cited by examiner

INTUITIVE CUSTOMIZATION SYSTEM

BACKGROUND OF THE INVENTION

1. Field of the Invention

The present disclosure relates to a customization system, and more particularly, to a customization system that allows customers to design customized products according to their intuitions.

2. Description of the Prior Art

In general, a product can be sold through a physical store or an online e-commerce. The online e-commerce only provides product sales information on the internet. The online e-commerce does not allow the customer to design a customized product personally, and is incapable of providing the customer an easy-to-use customized design interface either.

SUMMARY OF THE INVENTION

The present disclosure discloses a customization system that allows customers to design customized products according to their intuitions to solve the aforementioned drawback.

According to one embodiment, an intuitive customization system includes a server unit, a display device, an interface unit and a manufacturing station. The server unit is signally connected to an internet. The display device is signally connected to the server unit. The interface unit is displayed on the display device. The interface unit includes a working window frame, a first base image, a first part image, a first pattern menu and a function image. The first base image is displayed in the working window frame. N first positions are defined within the first base image. M second positions are defined outside the first base image. N is a positive integer, and M is a positive integer. The first part image is displayed at one of the N first positions or at one of the M second positions. The one of the N first positions corresponds to the one of the M second positions. The first pattern menu is selectively displayed in the working window frame. The first pattern menu includes P first patterns. P is a positive integer. When a user selects one of the P first patterns of the first pattern menu, the first part image displays a first customized pattern, and the first customized pattern represents the one of the P first patterns. The function image is displayed in the working window frame for being selected by the user. When the user selects the function image, the server unit receives a first user design. The first user design includes the first base image, the first part image and the first customized pattern. The manufacturing station is signally connected to the internet. The manufacturing station receives the first user design from the server unit and manufactures a finished product according to the first user design.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
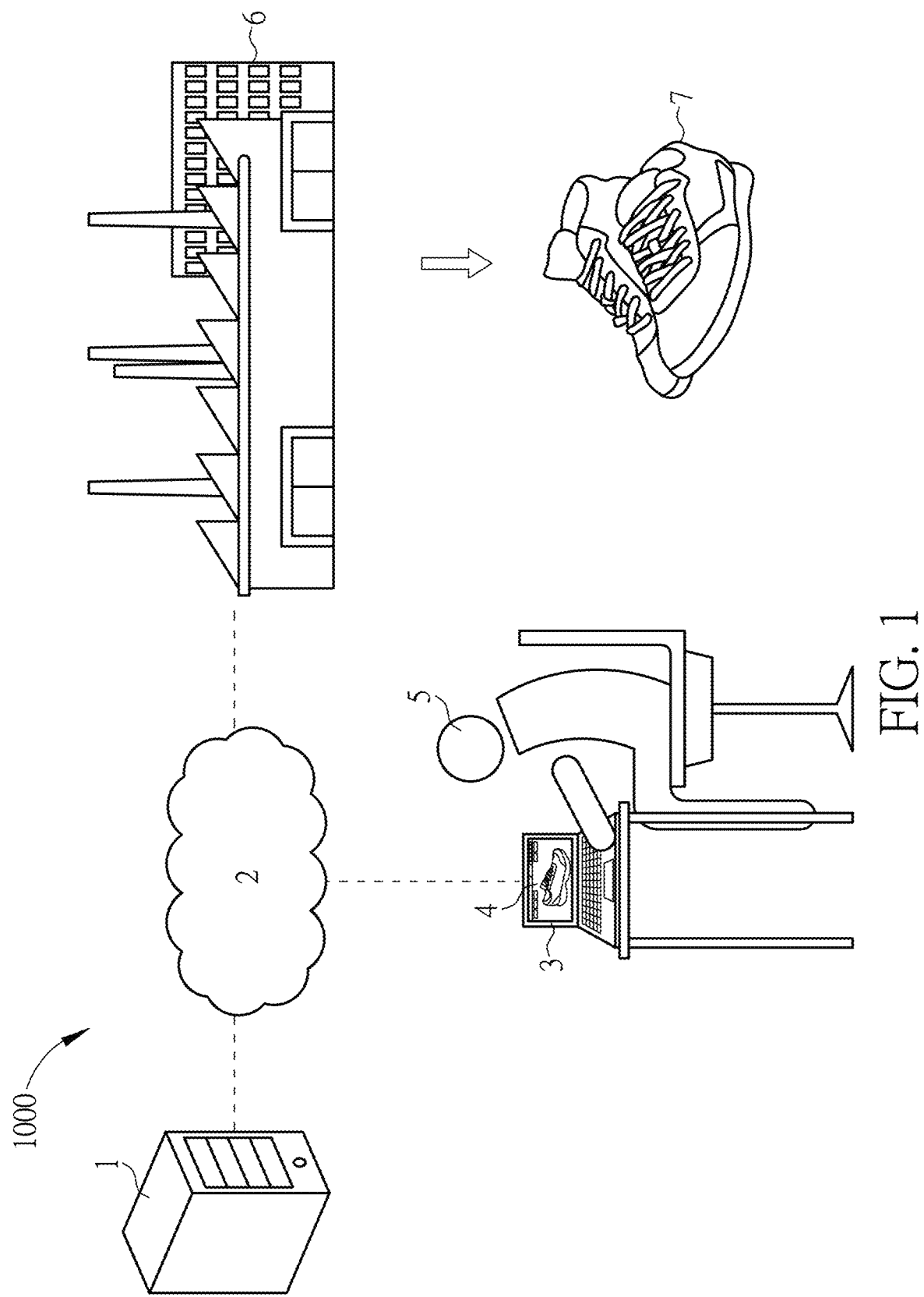
FIG. 1 is a schematic diagram showing an intuitive customization system according to a first embodiment of the present disclosure.

In order to enable the skilled persons in the art to better understand the present disclosure, hereinafter preferred embodiments with drawings are provided for illustrating the present disclosure and the effect to be achieved. It should be noted that the drawings are simplified schematic diagrams. Therefore, only elements related to the present disclosure and combination relationship thereof are shown to provide a clearer description of the basic framework or implementation methods of the present disclosure. The actual elements and configuration may be more complicated. In addition, for the sake of convenience, the number of the components in the drawings could be unequal the actual number thereof, the shape and size of the components may not draw in proportion to the actual shape and size, and the proportion thereof can be adjusted according to design requirements.

The directional terminology in the following embodiments, such as top, bottom, left, right, front or back, is used with reference to the orientation of the Figure(s) being described. As such, the directional terminology is used for purposes of illustration and is in no way limiting.

The ordinal number terminology, such as first, second and third, can be used to describe various elements, and the elements are not limited by definition of the ordinal number terminology. The ordinal number terminology is used to distinguish one element from other elements in the specification, and the ordinal number terminology of the element in the claims is arranged according to the claimed order and could be different from that in the specification. As such, a first element recited in the following description could be a second element in the claims.

Please refer to FIG. 1. FIG. 1 is a schematic diagram showing an intuitive customization system 1000 according to a first embodiment of the present disclosure. The intuitive customization system 1000 includes a server unit 1, a display device 3, an interface unit 4 and a manufacturing station 6. The server unit 1 is signally connected to an internet 2. The display device 3 is signally connected to the server unit 1. The interface unit 4 is displayed on the display device 3. The manufacturing station 6 is signally connected to the internet 2 for manufacturing a finished product 7. Herein, the server unit 1 can be a server which is a hardware/software integration that is capable of providing specific services to a computer of the user end of the internet 2. As for the hardware, the hardware can include a processor, a memory, interfaces and buses, clocks and timers, an isolator, a power management, etc. As for the software, the processor is required to be operated with an operating system (OS) and application programs (APPs). Since each host of the server may support multiple users at the same time, the OS is required to support "multiuser", which allows multiple users to use the services through connection at the same time. Also, the OS is required to support "multitask", which allows multiple APPs to be executed at the same time.

Herein, the display device 3 can be a display panel of a laptop. However, the present disclosure is not limited thereto. For example, the display device 3 can be a touch panel of a smartphone or a tablet computer, and the display device 3 can also be a display or a monitor of a desktop computer. The interface unit 4 can be a user interface (UI), a firmware for the communication between hardware, software for the communication between APPs, a database, or a combination thereof. The manufacturing station 6 can be a factory or a workshop, such as a factory or a workshop for manufacturing shoes, a garment factory or a tailor shop for manufacturing garments, a factory for manufacturing balls, etc.

Figure 2:
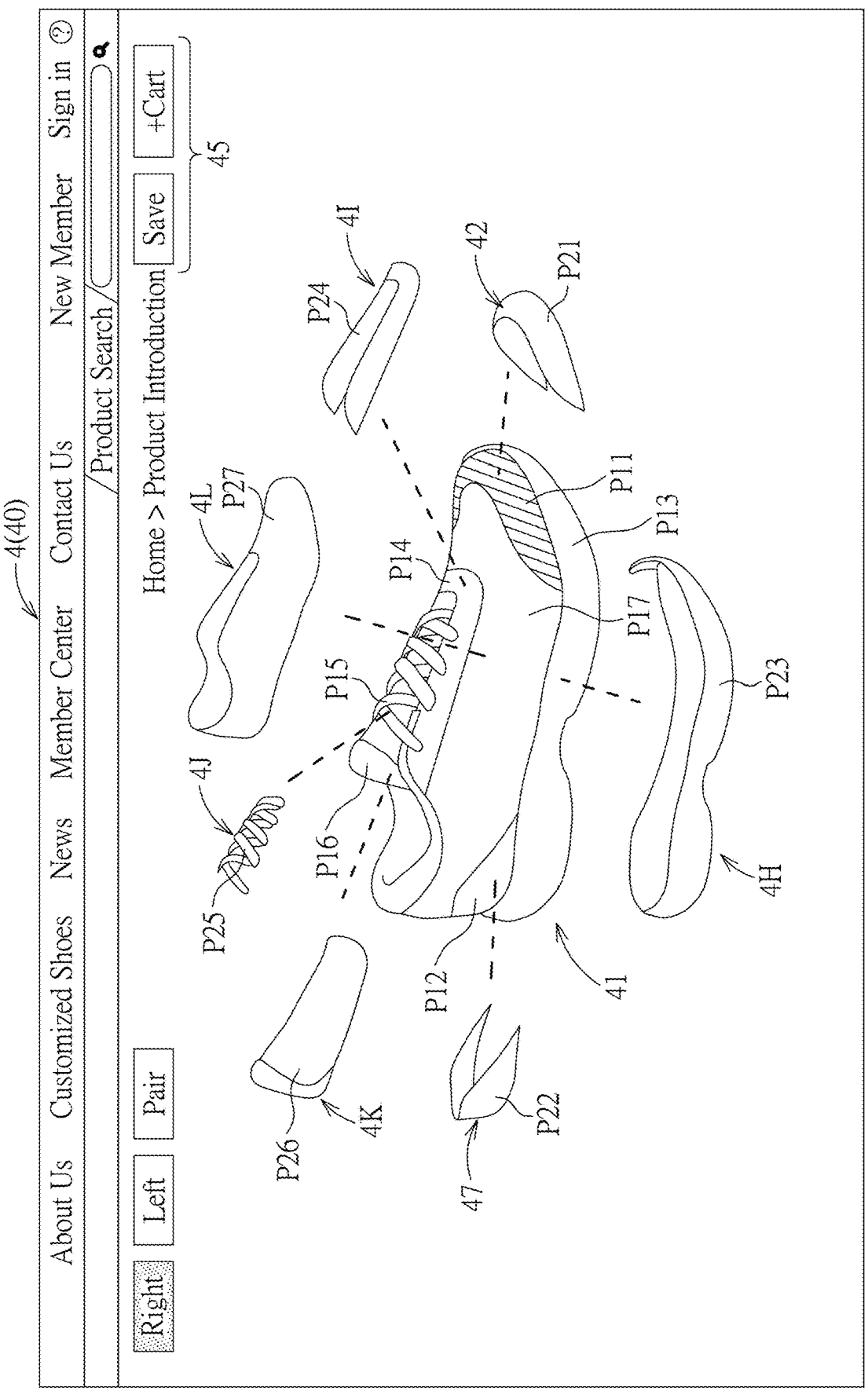
FIG. 2 is a schematic diagram of an interface unit according to the first embodiment of the present disclosure.
Figure 3:
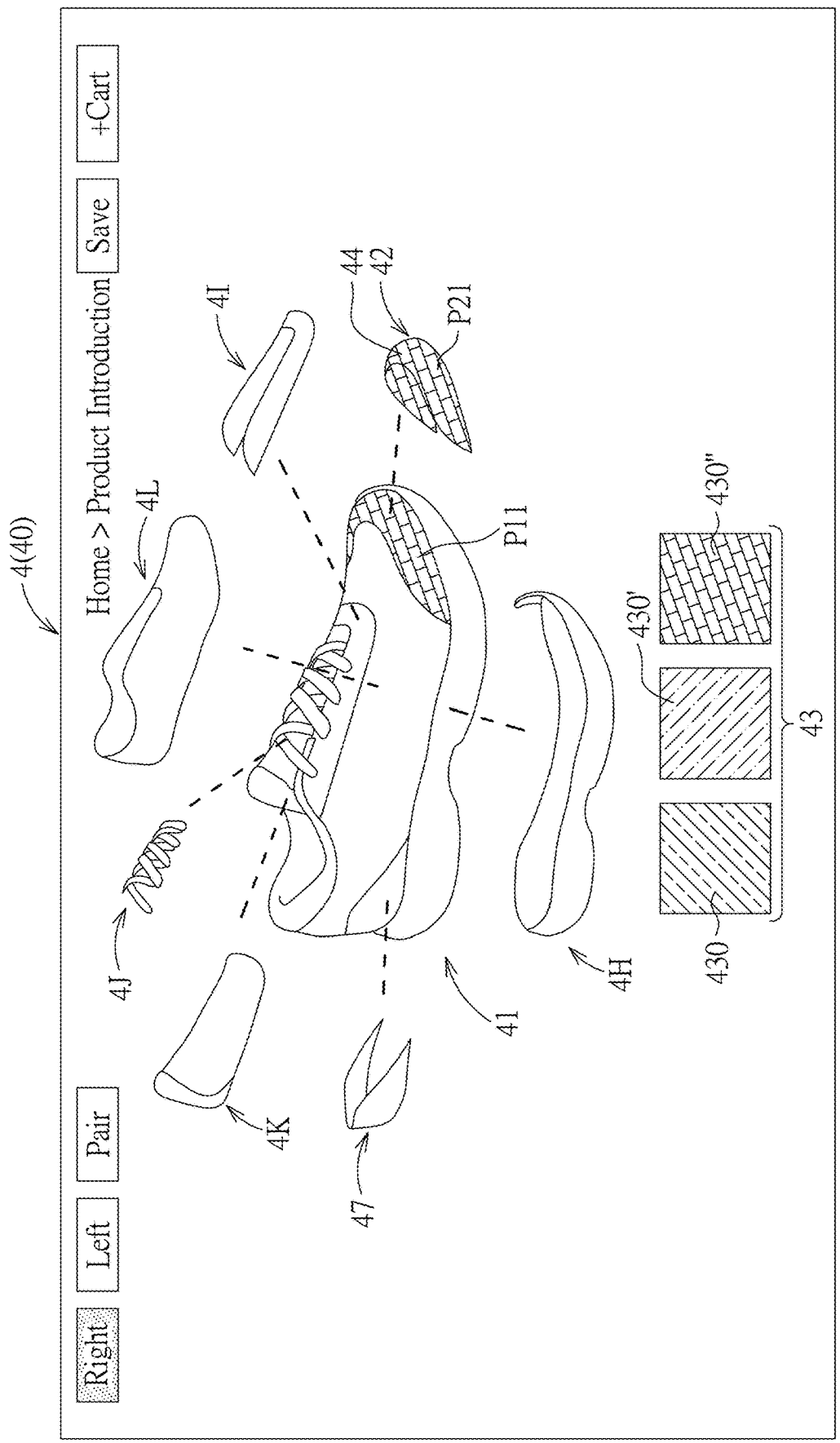
FIG. 3 is a schematic diagram of the interface unit in a first design stage according to the first embodiment of the present disclosure.
Figure 4:
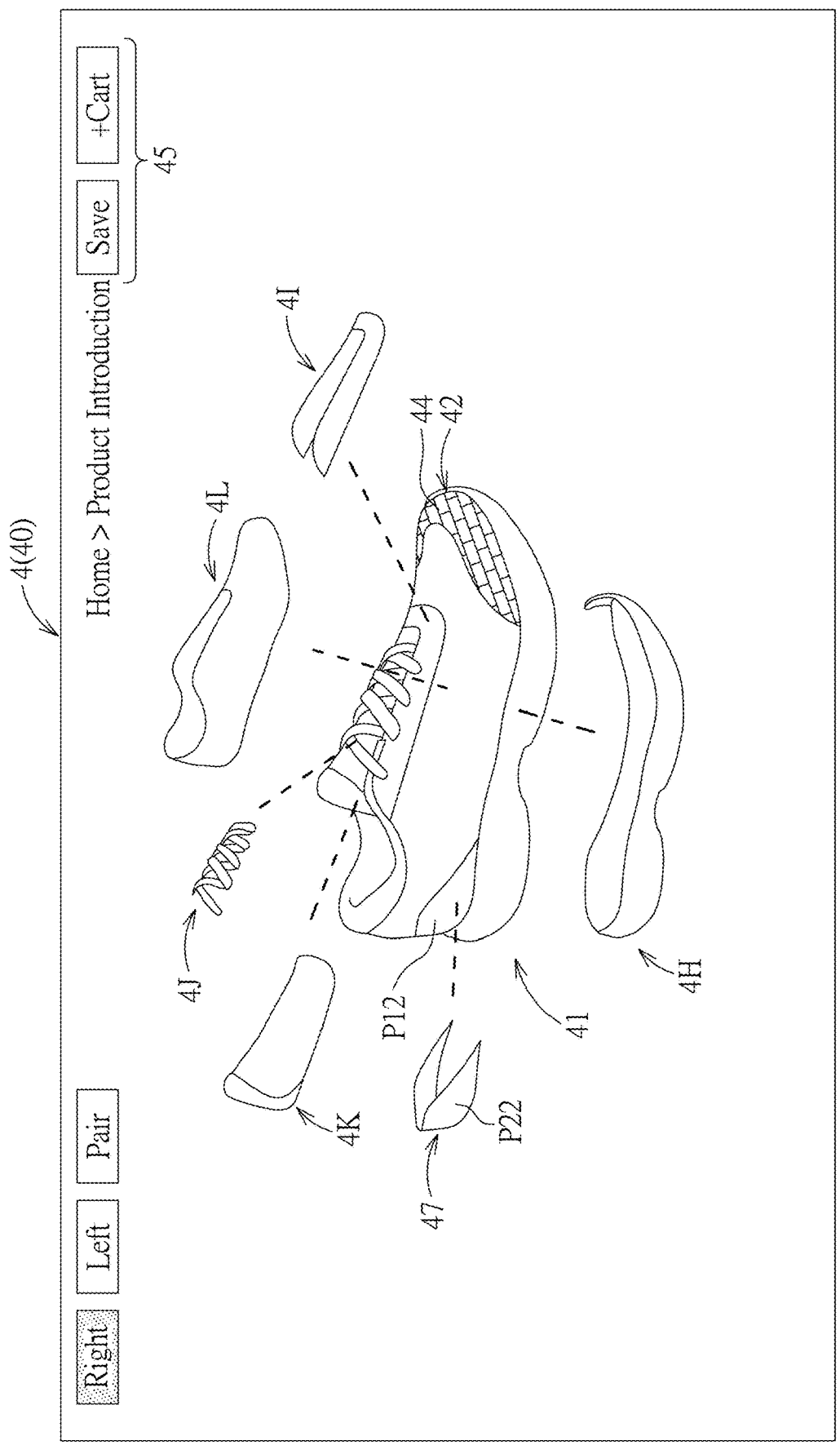
FIG. 4 is a schematic diagram of the interface unit in a first assembling stage according to the first embodiment of the present disclosure.

Please refer to FIG. 2 to FIG. 4. FIG. 2 is a schematic diagram of the interface unit 4 according to the first embodiment of the present disclosure. FIG. 3 is a schematic diagram of the interface unit 4 in a first design stage according to the first embodiment of the present disclosure. FIG. 4 is a schematic diagram of the interface unit 4 in a first assembling stage according to the first embodiment of the present disclosure. The interface unit 4 includes a working window frame 40, a first base image 41, a first part image 42, a first pattern menu 43 and a function image 45. The first base image 41 is displayed in the working window frame 40. In the embodiment, the first base image 41 is a three-dimensional computer graphic (3 DCG) representing a shoe. The first part image 42 is a 3 DCG representing a shoe part of the shoe (such as a tongue, laces, an upper, a sole, a front overlay, a back overlay, etc.). The 3 DCG refers to a digital model created by a computer and three-dimensional computing software. However, the present disclosure is not limited thereto. For example, the first base image 41 can also be a digitized two-dimensional image of the shoe, and the first part image 42 can also be a digitized two-dimensional image of the shoe part of the shoe.

Moreover, N first positions are defined within the first base image 41. M second positions are defined outside the first base image 41. N is a positive integer, and M is a positive integer. In the embodiment, N is equal to M, and Both of N and M are equal to seven. In other words, seven first positions P11, P12, P13, P14, P15, P16 and P17 are defined within the area covered by the first base image 41, and seven second positions P21, P22, P23, P24, P25, P26 and P27 are defined outside the area covered by the first base image 41. Preferably, the seven second positions P21, P22, P23, P24, P25, P26 and P27 are all within the working window frame 40.

In the embodiment, the interface unit 4 further includes a second part image 47, a third part image 4H, a fourth part image 4I, a fifth part image 4J, a sixth part image 4K and a seventh part image 4L. The first part image 42 is displayed at one of the seven first positions (herein, the first position P11) or at one of the seven second positions (herein, the second position P21). The second part image 47 is displayed at one of the seven first positions (herein, the first position P12) or at one of the seven second positions (herein, the second position P22). The third part image 4H is displayed at one of the seven first positions (herein, the first position P13) or at one of the seven second positions (herein, the second position P23). The fourth part image 4I is displayed at one of the seven first positions (herein, the first position P14) or at one of the seven second positions (herein, the second position P24). The fifth part image 4J is displayed at one of the seven first positions (herein, the first position P15) or at one of the seven second positions (herein, the second position P25). The sixth part image 4K is displayed at one of the seven first positions (herein, the first position P16) or at one of the seven second positions (herein, the second position P26). The seventh part image 4L is displayed at one of the seven first positions (herein, the first position P17) or at one of the seven second positions (herein, the second position P27). The one of the seven first positions corresponds to the one of the seven second positions. That is, the first positions P11, P12, P13, P14, P15, P16 and P17 correspond to the second positions P21, P22, P23, P24, P25, P26 and P27, respectively.

Preferably, the number of the part images equals to the number of the first positions, and the number of part images equals to the number of the second positions. That is, the number of the part images, the number of the first positions and the number of the second positions are equal. However, in other embodiments, the number of the part images may be larger than that of the first positions or the second positions.

Selectively, when the interface unit 4 is in a default operation mode, the first part image 42 is capable of being selected by a user 5 (see FIG. 1), and is initially located at the first position P11. When the first part image 42 is selected, the first part image 42 moves from the first position P11 to the second position P21. That is, the first part image 42 is initially located at the first position P11 within the first base image 41. When the user 5 desires to design the first part image 42, the user 5 can select the first part image 42 first, then the first part image 42 moves from the first position P11 within the first base image 41 to the second position P21 outside the first base image 41.

Similarly, the second part image 47, the third part image 4H, the fourth part image 4I, the fifth part image 4J, the sixth part image 4K and the seventh part image 4L are capable of being selected by the user 5, and are initially located at the first positions P12, P13, P14, P15, P16 and P17 within the first base image 41, respectively. When the second part image 47 is selected, the second part image 47 moves from the first position P12 within the first base image 41 to the second position P22 outside the first base image 41. When the third part image 4H is selected, the third part image 4H is moves from the first position P13 within the first base image 41 to the second position P23 outside the first base image 41. When the fourth part image 4I is selected, the fourth part image 4I moves from the first position P14 within the first base image 41 to the second position P24 outside the first base image 41, and so on.

Selectively, when the interface unit 4 is in another default operation mode, the first part image 42, the second part image 47, the third part image 4H, the fourth part image 4I, the fifth part image 4J, the sixth part image 4K and the seventh part image 4L are initially located at the first positions P11, P12, P13, P14, P15, P16 and P17 within the first base image 41, respectively. When the user 5 clicks an area outside the first base image 41, the first part image 42, the second part image 47, the third part image 4H, the fourth part image 4I, the fifth part image 4J, the sixth part image 4K, the seventh part image 4L, the first pattern menu 43 and the function image 45, the first part image 42, the second part image 47, the third part image 4H, the fourth part image 4I, the fifth part image 4J, the sixth part image 4K and the seventh part image 4L move from the first positions P11, P12, P13, P14, P15, P16 and P17 within the first base image 41 to the second positions P21, P22, P23, P24, P25 and P27 outside the first base image 41.

Furthermore, in the embodiment, when the first part image 42 is selected, the first pattern menu 43 is displayed in the working window frame 40; when the first part image 42 is not selected (for example, when the first part image 42 is in an initial state), the first pattern menu 43 is not displayed in the working window frame 40. That is, in the embodiment, the first pattern menu 43 is selectively displayed in the working window frame 40. In other embodiment, the first pattern menu 43 can be displayed in the working window frame 40 all the time whether the first part image 42 is selected or not.

In the embodiment, as shown in FIG. 3, the first pattern menu 43 includes three first patterns 430, 430' and 430". The number of the first patterns is only exemplary, and the present disclosure is not limited thereto. That is, the interface units, having the first pattern menu 43 including P first patterns and P being a positive integer, are all within the scope of the present disclosure. When the user 5 selects one of the first patterns 430, 430' and 430" (such as the first pattern 430") of the first pattern menu 43, it allows the first part image 42 to display a first customized pattern 44. The first customized pattern 44 is actually representing the content of the first patterns 430" on the first part image 42. In other words, when the user 5 selects one of the first patterns 430, 430' and 430" (such as the first pattern 430"), the server unit 1 calculates based on the pattern data corresponding to first pattern 430" and the image data corresponding to first part image 42 to generate a calculated result, and the calculated result is specifically rendered on the first part image 42 to generate the first customized pattern 44. As such, the first customized pattern 44 represents the first pattern 430". Moreover, in the embodiment, the first part image 42 is located at the second position P21. While the first part image 42 displays the first customized pattern 44, the portion of the first base image 41 located at the first position P11 also displays the first customized pattern 44 provisionally, which allows the user 5 to preview the first base image 41 with the customized design of the first part image 42. In other embodiment, While the first part image 42 displays the first customized pattern 44, the portion of the first base image 41 located at the first position P11 may not correspondingly display the first customized pattern 44.

Furthermore, in the embodiment, yet another default operation mode of the interface unit 4 is as follows. In FIG. 3, the first part image 42 is initially located at the second position P21 outside the first base image 41. In this embodiment, when the first part image 42 and one of the first patterns 430, 430' and 430" of the first pattern menu 43 are selected by the user 5 in sequence, the server unit 1 allows the first part image 42 to display the first customized pattern 44. After the first part image 42 displays the first customized pattern 44, the first part image 42 moves from the second position P21 outside the first base image 41 to the first position P11 within the first base image 41, as shown in FIG. 4.

Furthermore, the function image 45 is displayed in the working window frame 40 for being selected by the user 5. In other embodiments, the server unit 1 can predefine the patterns of the second part image 47, the third part image 4H, the fourth part image 4I, the fifth part image 4J, the sixth part image 4K and the seventh part image 4L. The user 5 can only design the pattern of the first part image 42, such that the time of the customization procedure can be shortened. In this case, after the user 5 completes the design of the first part image 42, the user 5 can directly select the function image 45 (for example, the image labelled with "Save" in FIG. 4). When the function image 45 labelled with "Save" is selected by the user 5, the server unit 1 receives a first user design, wherein the first user design includes the first base image 41, the first part image 42, the first customized pattern 44, and the predefined pattern data of the second part image 47, the third part image 4H, the fourth part image 4I, the fifth part image 4J, the sixth part image 4K and the seventh part image 4L. After the server unit 1 receives the first user design, the manufacturing station 6 is capable of receiving the first user design from the server unit 1 and manufactures a finished product 7 according to the first user design, as shown in FIG. 1. As such, the user 5 can conveniently design customized products through the interface unit 4. Accordingly, an easy-to-use customization system is provided to the user 5.

In this embodiment, the server unit 1 would provide another customization mode which allows the user 5 to design the patterns of all the part images, i.e., the first part image 42, the second part image 47, the third part image 4H, the fourth part image 4I, the fifth part image 4J, the sixth part image 4K and the seventh part image 4L. In the said customization mode, the server unit 1 does not predefine the patterns of the first part image 42, the second part image 47, the third part image 4H, the fourth part image 4I, the fifth part image 4J, the sixth part image 4K and the seventh part image 4L, or rather makes the patterns of the first part image 42, the second part image 47, the third part image 4H, the fourth part image 4I, the fifth part image 4J, the sixth part image 4K and the seventh part image 4L open to the user 5 to change them.

Figure 5:
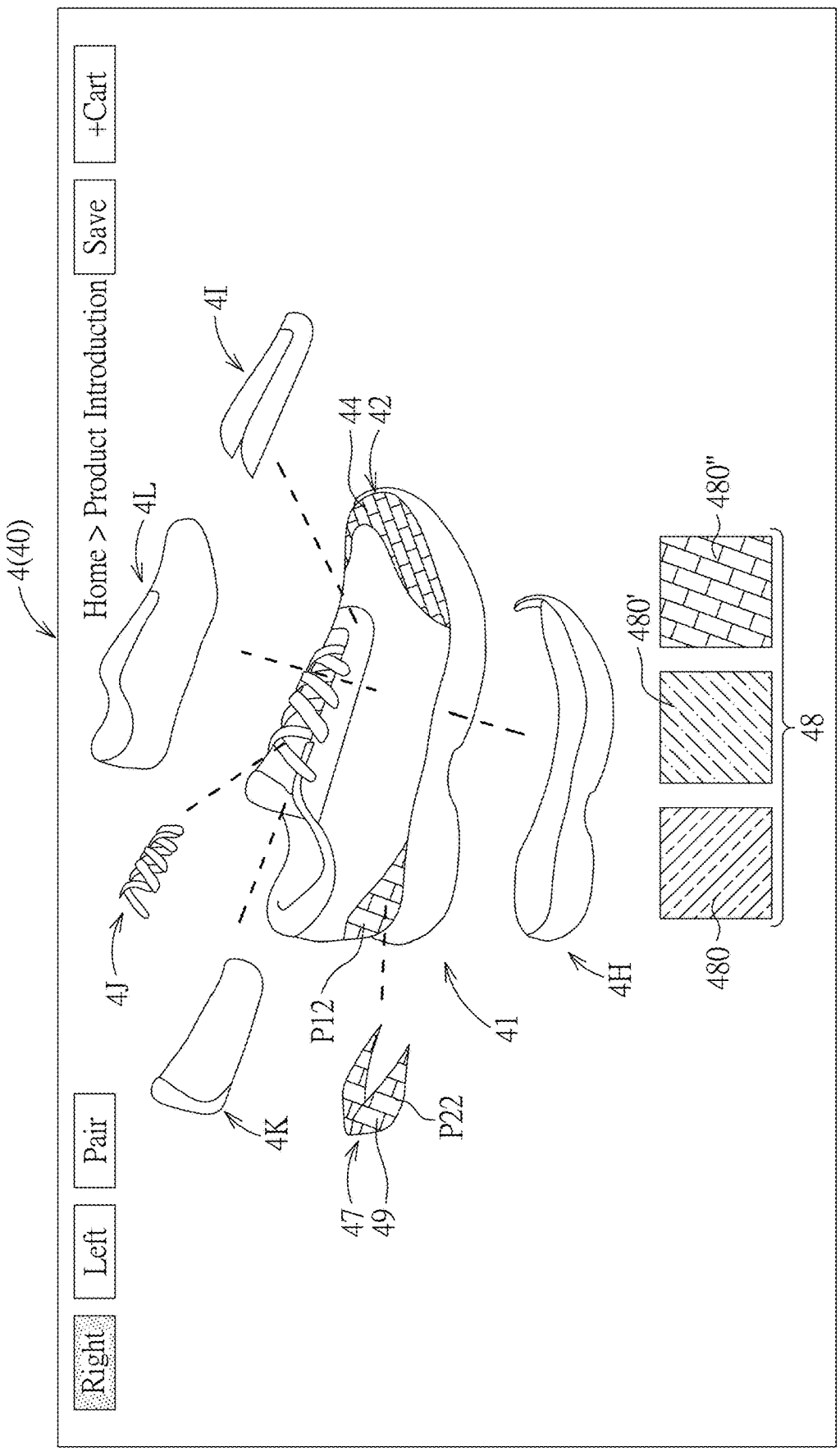
FIG. 5 is a schematic diagram of the interface unit in a second design stage according to the first embodiment of the present disclosure.
Figure 6:
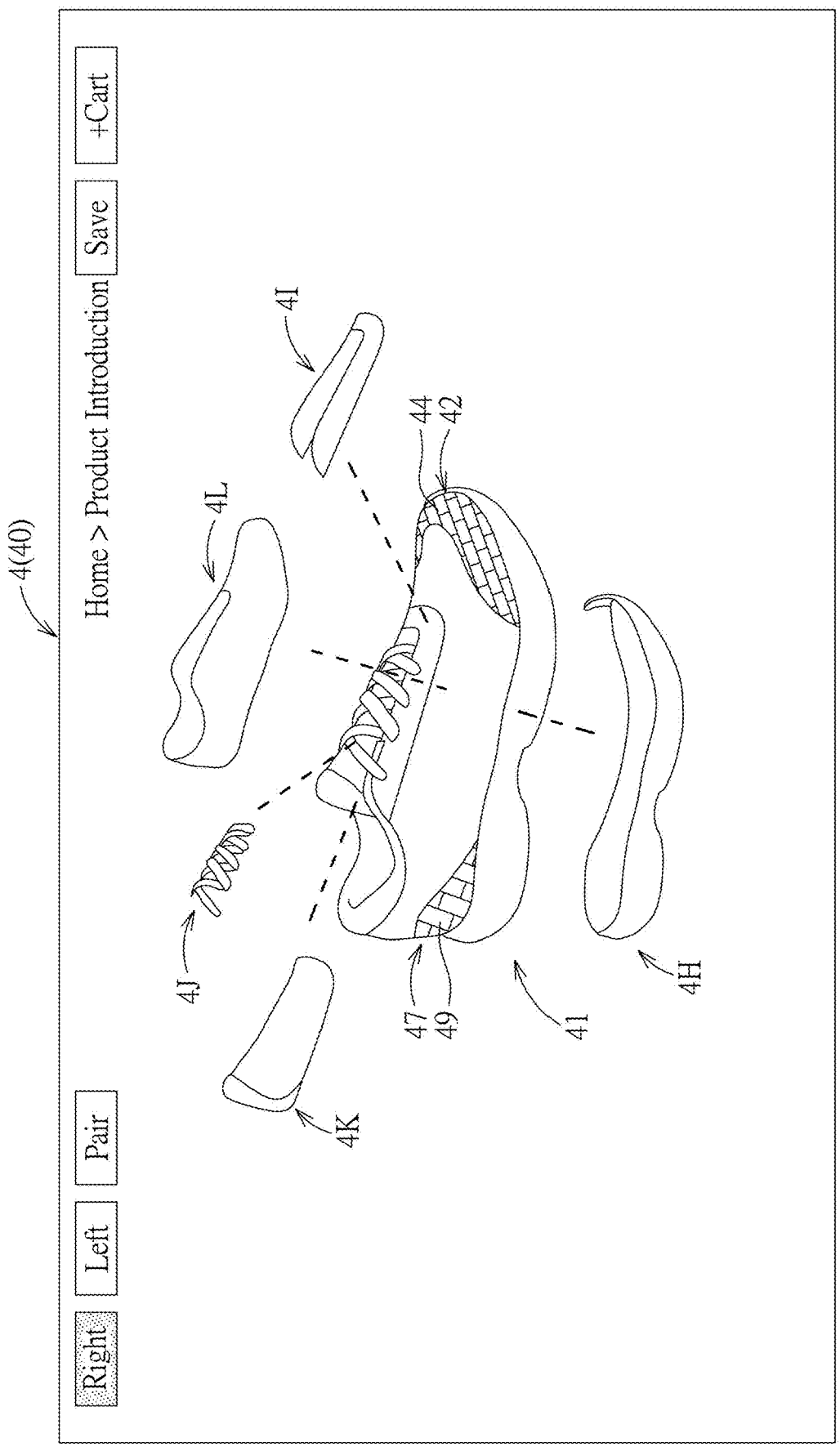
FIG. 6 is a schematic diagram of the interface unit in a second assembling stage according to the first embodiment of the present disclosure.
Figure 7:
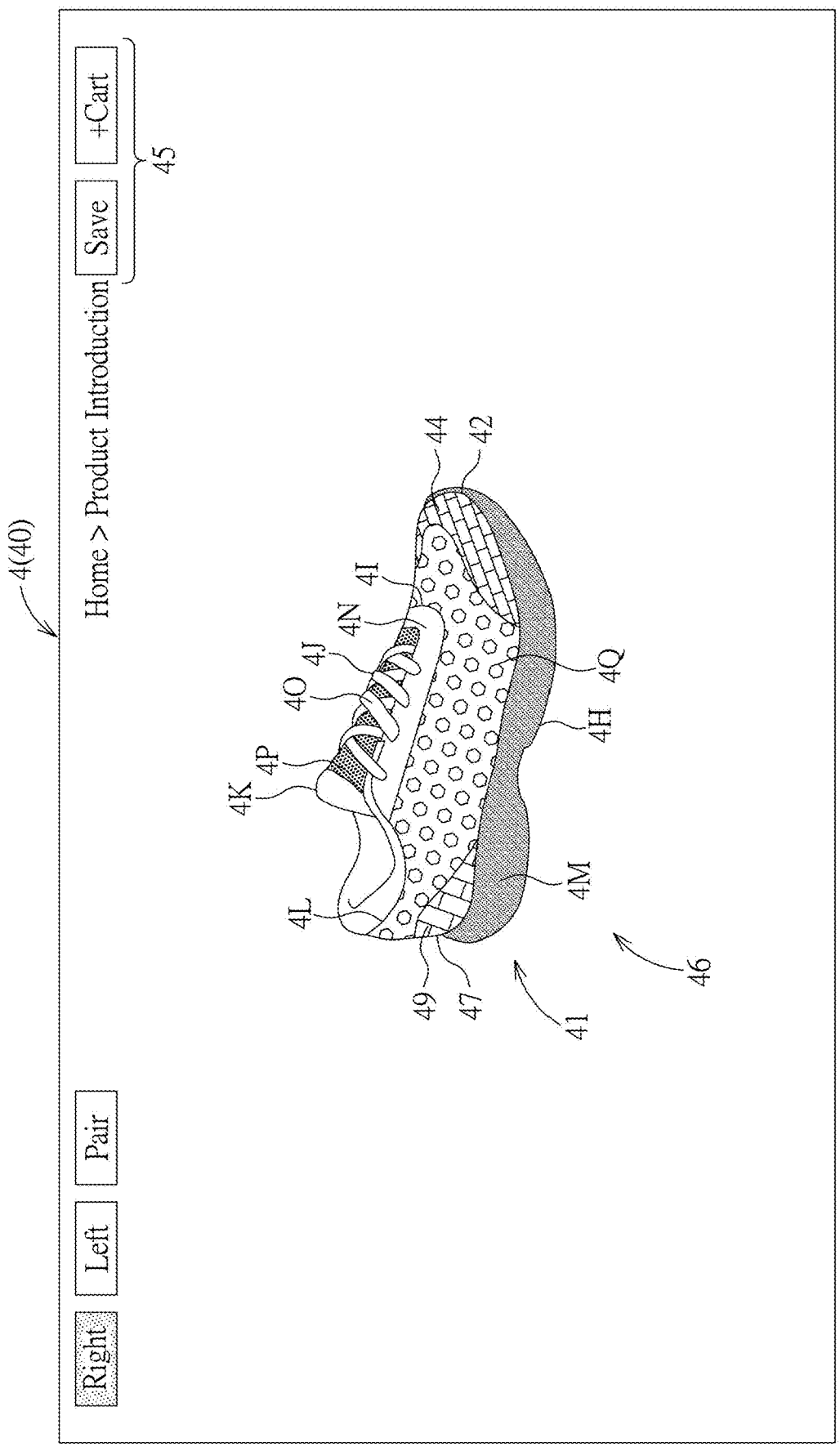
FIG. 7 is a schematic diagram of the interface unit in a design completion stage according to the first embodiment of the present disclosure.

Please refer to FIG. 5 to FIG. 7, which are follow-up exemplifications after FIG. 2 to FIG. 4. FIG. 5 is a schematic diagram of the interface unit 4 in a second design stage according to the first embodiment of the present disclosure. FIG. 6 is a schematic diagram of the interface unit 4 in a second assembling stage according to the first embodiment of the present disclosure. FIG. 7 is a schematic diagram of the interface unit 4 in a design completion stage according to the first embodiment of the present disclosure. After the user 5 completes the design of the first part image 42 (as shown in FIG. 4), the user 5 can select to design the second part image 47.

In the embodiment, as shown in FIG. 5, the interface unit 4 further includes a second pattern menu 48. When the second part image 47 is selected, the first pattern menu 43 is hidden from the working window frame 40, and the second pattern menu 48 is displayed in the working window frame 40. The second pattern menu 48 includes three second patterns 480, 480' and 480". The number of the second patterns of the second pattern menu 48 is only exemplary, and the present disclosure is not limited thereto. That is, interface units, having the second pattern menu 48 including Q second patterns and Q being a positive integer, are all within the scope of the present disclosure. In the embodiment, the second patterns of the second pattern menu 48 (shown in FIG. 5) are different from the first patterns of the first pattern menu 43 (shown in FIG. 3). However, the present disclosure is not limited thereto. For example, the second patterns of the second pattern menu 48 and the first patterns of the first pattern menu 43 of the interface unit 4 can be the same, which depends on practical needs.

Similarly, when the user 5 selects one of the second patterns 480, 480' and 480" (such as the second pattern 480") of the second pattern menu 48, it allows the second part image 47 to display a second customized pattern 49. The second customized pattern 49 is actually representing the content of the second pattern 480" on the second part image 47. In other words, when the user 5 selects the second pattern 480", the server unit 1 calculates based on the pattern data corresponding to the second pattern 480" and the image data corresponding to second part image 47 to generate a calculated result, and the calculated result is specifically rendered on the second part image 47 to generate the second customized pattern 49. As such, the second customized pattern 49 represents the second pattern 480".

Furthermore, as shown in FIG. 5 of this embodiment, the second part image 47 is initially located at the second position P22 outside the first base image 41. When the second part image 47 and one of the second patterns 480, 480' and 480" of the second pattern menu 48 are selected by the user 5 in sequence, the server unit 1 allows the second part image 47 to display the second customized pattern 49. After the second part image 47 displays the second customized pattern 49, the second part image 47 moves from the second position P22 outside the first base image 41 to the first position P12 within the first base image 41, as shown in FIG. 6.

The third part image 4H, the fourth part image 4I, the fifth part image 4J, the sixth part image 4K and the seventh part image 4L can be design in a similar procedure, such that a third customized pattern 4M, a fourth customized pattern 4N, a fifth customized pattern 4O, a sixth customized pattern 4P and a seventh customized pattern 4Q can be generated, as shown in FIG. 7. After completing the above design steps, the user 5 can select the function image 45 labelled with "Save", the server unit 1 receives a first user design 46, wherein the first user design 46 includes the image/pattern data of the first base image 41, the first part image 42, the first customized pattern 44, the second part image 47, the second customized pattern 49, the third part image 4H, the third customized pattern 4M, the fourth part image 4I, the fourth customized pattern 4N, the fifth part image 4J, the fifth customized pattern 4O, the sixth part image 4K, the sixth customized pattern 4P, the seventh part image 4L and the seventh customized pattern 4Q. After the server unit 1 receives the first user design 46, the manufacturing station 6 (see FIG. 1) is capable of receiving the first user design 46 from the server unit 1 and manufactures a finished product 7 according to the first user design 46. As such, the user 5 can conveniently design customized products through the interface unit 4. Accordingly, an easy-to-use customization system is provided to the users those who have diverse preferences.

Moreover, the first user design 46 can further include a text. The text can be a Chinese character string, an English character string, a numeric character string, or a combination thereof. For example, according to one embodiment, the text can be displayed at one of the first positions P11, P12, P13, P14, P15, P16 and P17, i.e., the text is only displayed within the boundary nominally defined by the one of the first positions P11, P12, P13, P14, P15, P16 and P17. According to another embodiment, the text is displayed within the area covered by the first base image 41. That is, the text is not restricted by the boundary of any of the first positions P11, P12, P13, P14, P15, P16 and P17. For example, a portion of the text can be displayed at one of the first positions P11, P12, P13, P14, P15, P16 and P17, and another portion of the text can be displayed at another one of the first positions P11, P12, P13, P14, P15, P16 and P17 adjacent to the aforementioned one. That is, the text can cross the boundaries of first positions P11, P12, P13, P14, P15, P16 and P17, and can be displayed across multiple adjacent first positions.

In the embodiment, the first base image 41 can represent a realistic or simulated image of a shoe. However, the present disclosure is not limited thereto. The first base image 41 can represent only an outline or a contour of a shoe. The first part image 42, the second part image 47, the third part image 4H, the fourth part image 4I, the fifth part image 4J, the sixth part image 4K and the seventh part image 4L can represent essential parts of the shoe (i.e., shoe parts).

As for customizing a pair of shoes, the present disclosure provides a left-right-symmetric design mode and an independent right/left design mode. For example, in the left-right-symmetric design mode, when the user 5 completes the first user design 46 as shown in FIG. 7 (wherein the first base image 41 in FIG. 7 is a realistic image of a right shoe of a pair of shoes), the server unit 1 can directly mirror the first user design 46 to obtain a left shoe of the pair of shoes, such that the left shoe and the right shoe of the pair of shoes would have left-right-symmetric designs.

Figure 8:
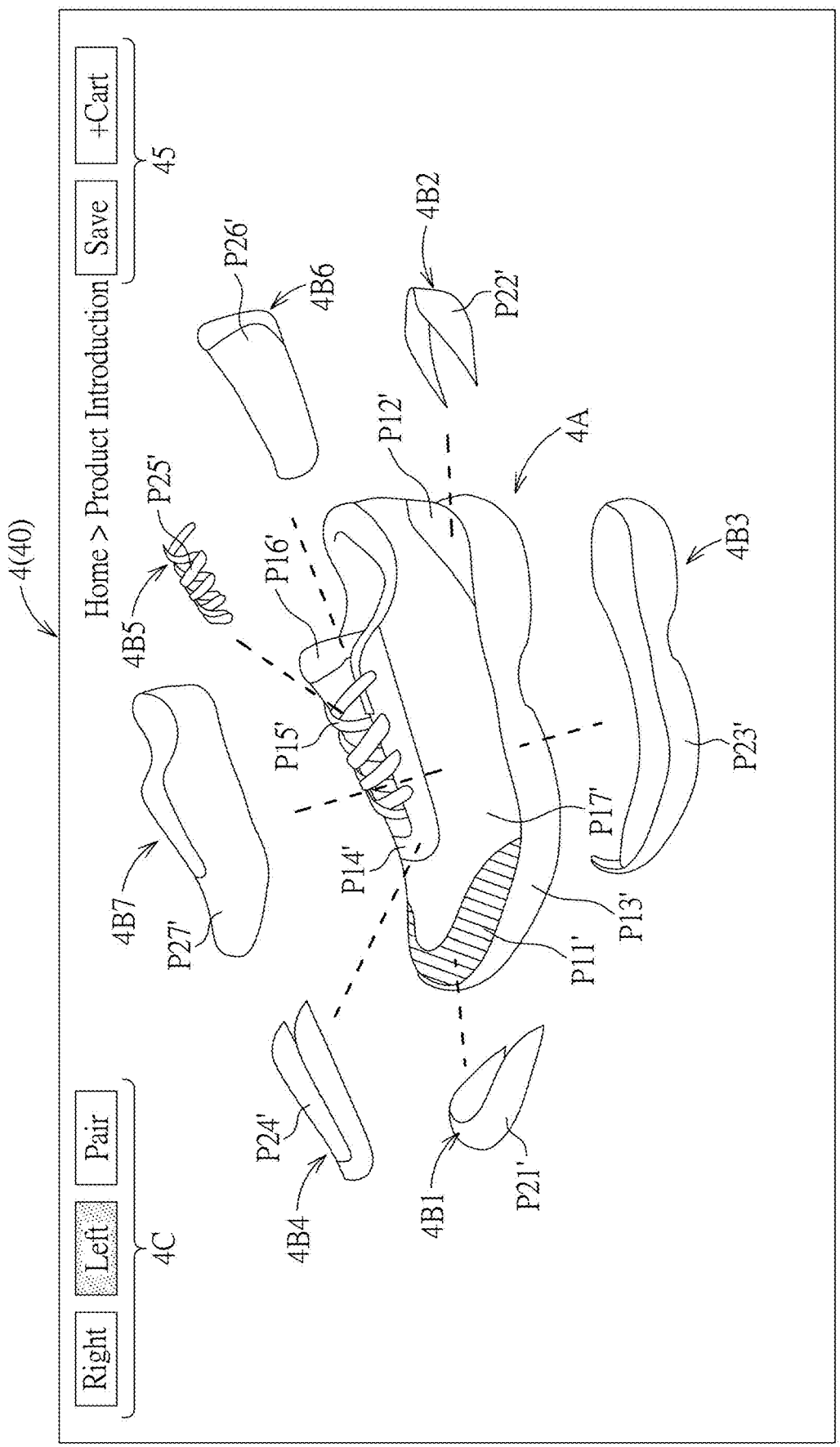
FIG. 8 is a schematic diagram showing an independent right/left design mode according to the first embodiment of the present disclosure.

On the other hand, please refer to FIG. 8, which is a schematic diagram showing an independent right/left design mode according to the first embodiment of the present disclosure. In the independent right/left design mode of the embodiment, the interface unit 4 may further include a second base image 4A, another first part image 4B1, another second part image 4B2, another third part image 4B3, another fourth part image 4B4, another fifth part image 4B5, another sixth part image 4B6 and another seventh part image 4B7. In the embodiment, when the user 5 completes the first user design 46 as shown in FIG. 7, the user 5 can click one specific portion of a switch button image 4C of the interface unit 4, such that the second base image 4A is displayed in the working window frame 40. The second base image 4A can be a realistic image of a left shoe of the pair of shoes. Seven first positions P11', P12', P13', P14', P15', P16' and P17' are defined within the second base image 4A. Seven second positions P21', P22', P23', P24', P25', P26' and P27' are defined outside the second base image 4A. The first part image 4B1 is displayed at the first position P11' or at the second position P21'. The second part image 4B2 is displayed at the first position P12' or at the second position P22'. The third part image 4B3 is displayed at the first position P13' or at the second position P23'. The fourth part image 4B4 is displayed at the first position P14' or at the second position P24'. The fifth part image 4B5 is displayed at the first position P15' or at the second position P25'. The sixth part image 4B6 is displayed at the first position P16' or at the second position P26'. The seventh part image 4B7 is displayed at the first position P17' or at the second position P27'. The customization procedure of the left shoe is similar to that of the right shoe, which is not repeated for the sake of conciseness. As such, the left shoe and the right shoe may have different designs according the preference of the user 5.

Figure 9:
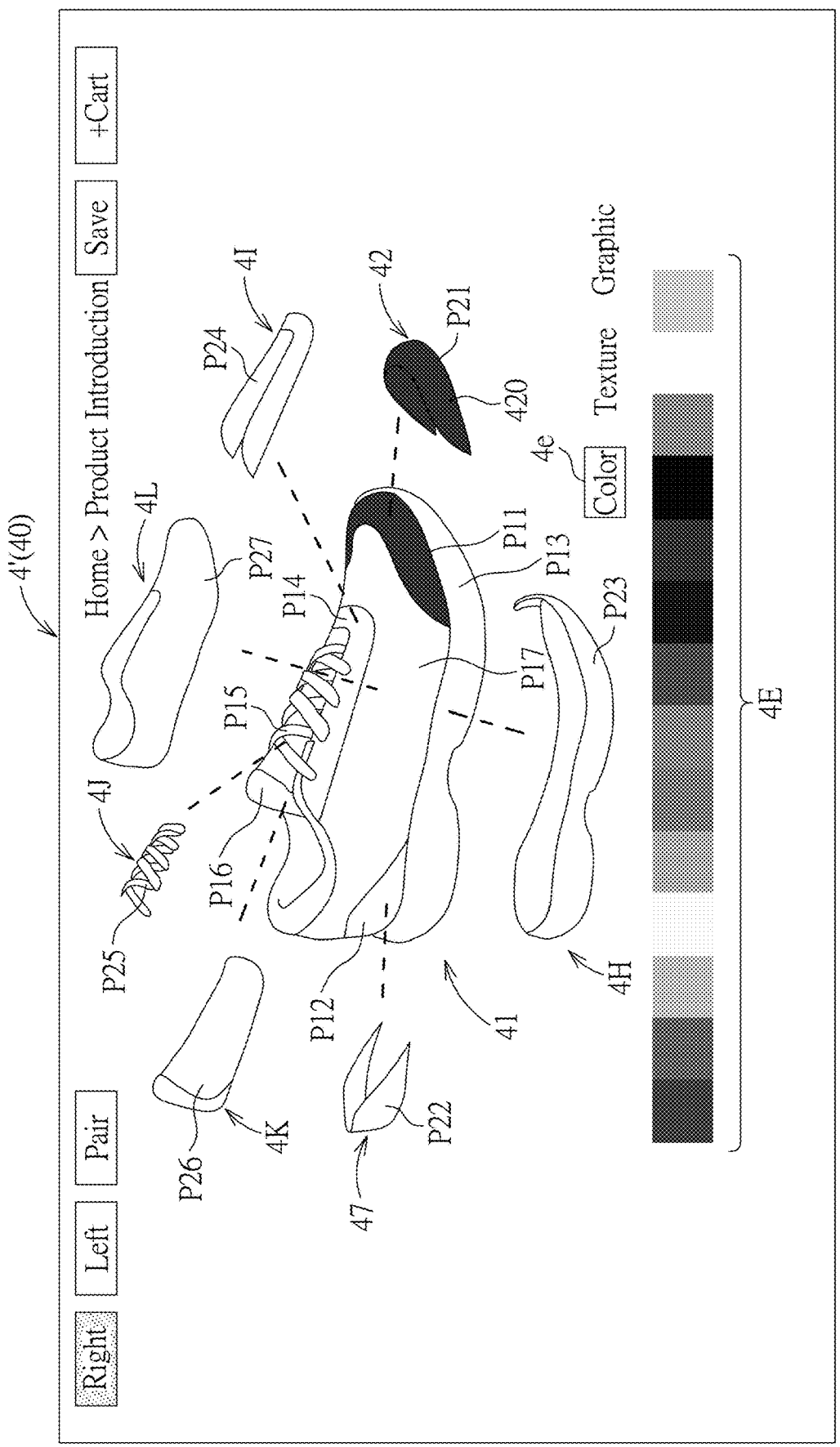
FIG. 9 is a schematic diagram of an interface unit showing a first category pattern menu according to a second embodiment of the present disclosure.
Figure 10:
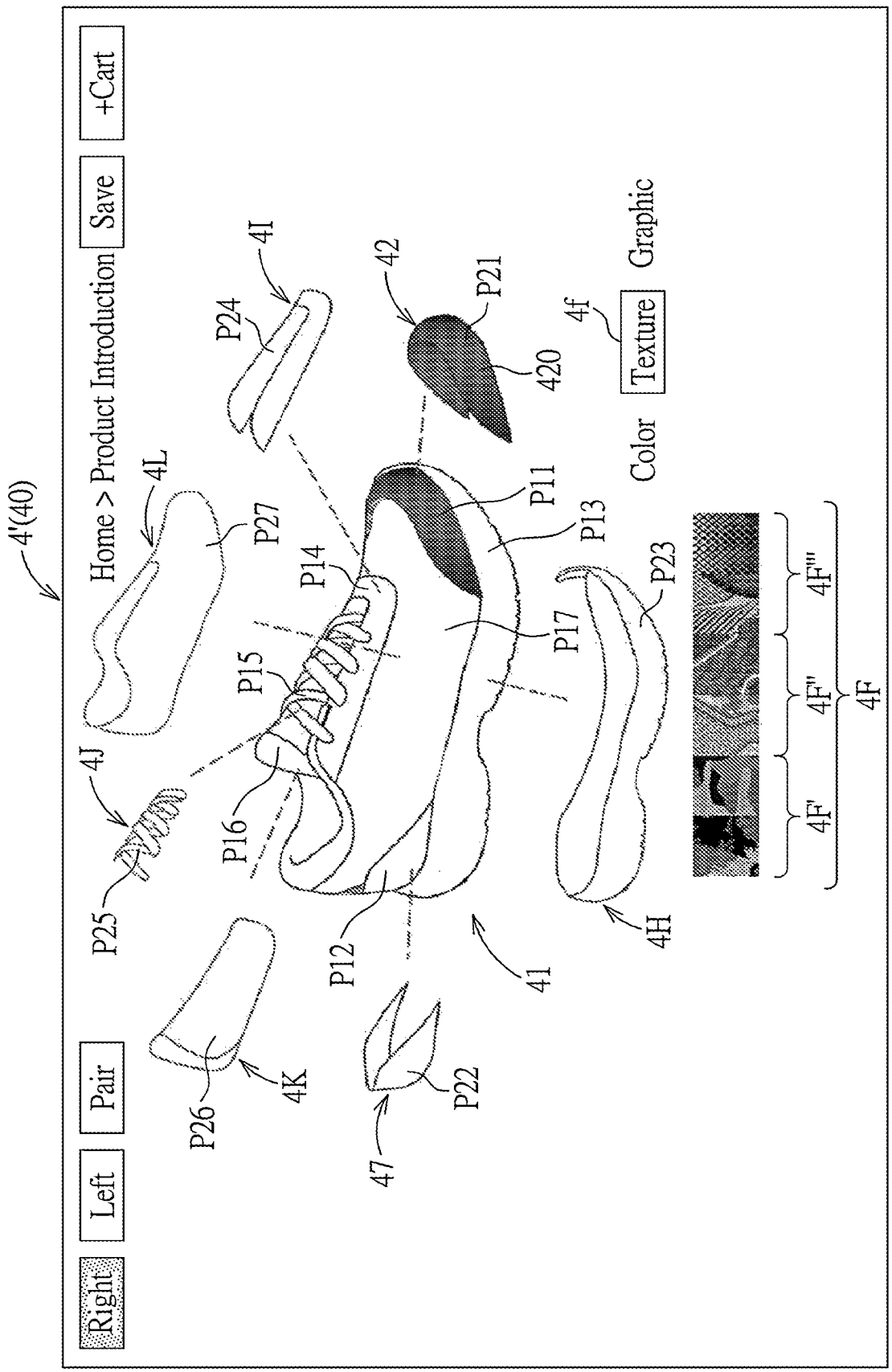
FIG. 10 is a schematic diagram of the interface unit showing a second category pattern menu according to the second embodiment of the present disclosure.
Figure 11:
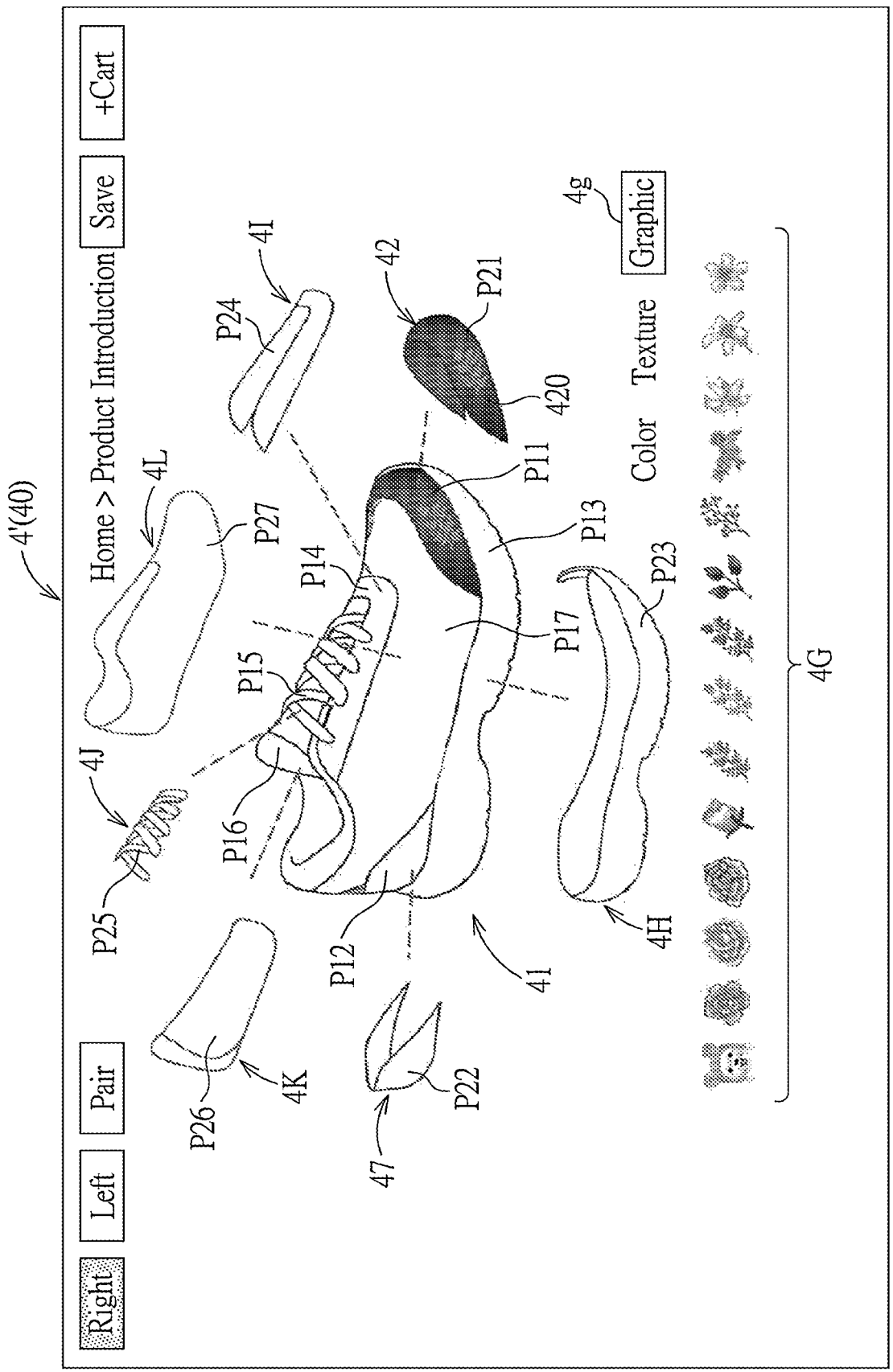
FIG. 11 is a schematic diagram of the interface unit showing a third category pattern menu according to the second embodiment of the present disclosure.

Please refer to FIG. 9 to FIG. 11. FIG. 9 is a schematic diagram of an interface unit 4' showing a first category pattern menu 4E according to a second embodiment of the present disclosure. FIG. 10 is a schematic diagram of the interface unit 4' showing a second category pattern menu 4F according to the second embodiment of the present disclosure. FIG. 11 is a schematic diagram of the interface unit 4' showing a third category pattern menu 4G according to the second embodiment of the present disclosure. FIGS. 9, 10 and 11 are presented in grayscale. According to practical needs, the first patterns of the first category pattern menu 4E, the second category pattern menu 4F and the third category pattern menu 4G, the first part image 42 located at the second position P21 and the portion of the first base image 41 located at the first position P11 may be colorful. The main differences between the interface unit 4' of the second embodiment and the interface unit 4 of the first embodiment are the P first patterns of the first pattern menu. In this embodiment, the P first patterns includes various kinds of patterns, which are categorized into the first category pattern menu 4E, the second category pattern menu 4F and the third category pattern menu 4G. The first category pattern menu 4E is a color menu, i.e., a part of the P first patterns are color patterns. The second category pattern menu 4F is a texture menu, i.e., another part of the P first patterns are texture patterns or tiled patterns. The third category pattern menu 4G is a graphic menu, i.e., yet another part of the P first patterns are graphic patterns. However, the present disclosure is not limited thereto. For example, at least one of the P first patterns can be an authorized pattern. The authorized patterns can be patterns of famous movie characters, patterns of famous cartoon characters, patterns designed by famous companies or a combination thereof. The authorized pattern may be obtained by the server unit 1 from an external server 1' (shown in FIG. 13) via the internet 2, or may be loaded into the server unit 1 by an administrator. In the embodiment, the first pattern menu is displayed in the interface unit 4' all the time, but can be switched between the first category pattern menu 4E, the second category pattern menu 4F and the third category pattern menu 4G.

Furthermore, in the embodiment, the interface unit 4' can further include a first category menu button 4e (which is exemplarily illustrated as a "Color" button in FIG. 9), a second category menu button 4f (which is exemplarily illustrated as a "Texture" button in FIG. 10) and a third category menu button 4g (which is exemplarily illustrated as a "Graphic" button in FIG. 11). As shown in FIG. 9, when the user 5 selects the first category menu button 4e, the first category pattern menu 4E is displayed in the interface unit 4' for the user 5 to select a color pattern. As shown in FIG. 10, when the user 5 selects the second category menu button 4f, the second category pattern menu 4F is displayed in the interface unit 4' for the user 5 to select a texture pattern. As shown in FIG. 11, when the user 5 selects the third category menu button 4g, the third category pattern menu 4G is displayed in the interface unit 4' for the user 5 to select a graphic pattern.

As shown in FIG. 10, in this embodiment, the texture patterns of the second category pattern menu 4F can be further categorized into three sub-categories, which are a first sub-category menu 4F', a second sub-category menu 4F" and a third sub-category menu 4F'". The first sub-category menu 4F' includes a plurality of color combination patterns. The second sub-category menu 4F" includes a plurality of texture combination patterns. The third sub-category menu 4F'" includes a plurality of seamless patterns. As an example, the first sub-category menu 4F', the second sub-category menu 4F" and the third sub-category menu 4F'" of the second category pattern menu 4F are displayed in the interface unit 4' at the same time. However, the first sub-category menu 4F', the second sub-category menu 4F" and the third sub-category menu 4F'" can also be displayed in the interface unit 4' independently according to practical needs.

On the other hand, the first part image 42 can initially have a first preset pattern 420 (as shown in FIG. 9 and FIG. 10). The first preset pattern 420 can be predefined by the server unit 1. Or, alternatively, the first preset pattern 420 can also be obtained by the user 5 selecting one of the P first patterns of the first pattern menu (due to the first pattern menu displayed all the time), and the first preset pattern represents the one of the P first patterns.

Specifically, for the aforesaid alternative, when the user 5 selects one of the color patterns of the first category pattern menu 4E, the first preset pattern 420 would represent a color pattern. When the user 5 selects one of the color combination patterns of the first sub-category menu 4F' of the second category pattern menu 4F, the first preset pattern 420 would represent a color combination pattern. When the user 5 selects one of the texture combination patterns of the second sub-category menu 4F" of the second category pattern menu 4F, the first preset pattern 420 would represent a texture combination pattern. When the user 5 selects one of the seamless patterns of the third sub-category menu 4F'" of the second category pattern menu 4F, the first preset pattern 420 would represent a seamless pattern. When the user 5 selects one of the graphic patterns of the third category pattern menu 4G, the first preset pattern 420 would represent a graphic pattern. In other words, the first preset pattern 420 of the first part image 42 can initially be the color pattern, the color combination pattern, the texture combination pattern, the seamless pattern or the graphic pattern.

In this embodiment, when the user 5 selects one of the texture patterns or one of the color patterns of the P first patterns of the first pattern menu (such as the first category pattern menu 4E or the second category pattern menu 4F), the first preset pattern 420 is replaced by the first customized pattern corresponding to the one of the texture patterns or the one of the color patterns being selected, such that the first customized pattern represents the one of the texture patterns or the one of the color patterns being selected.

Furthermore, in the embodiment, when the user 5 selects one of the graphic patterns of the P first patterns of the first pattern menu (such as the third category pattern menu 4G), the first customized pattern is generated by the one of the graphic patterns being selected and the first preset pattern 420, wherein the first customized pattern represents the one of the graphic patterns being selected and the first preset pattern 420 at the same time, as shown in FIG. 11.

Figure 12:
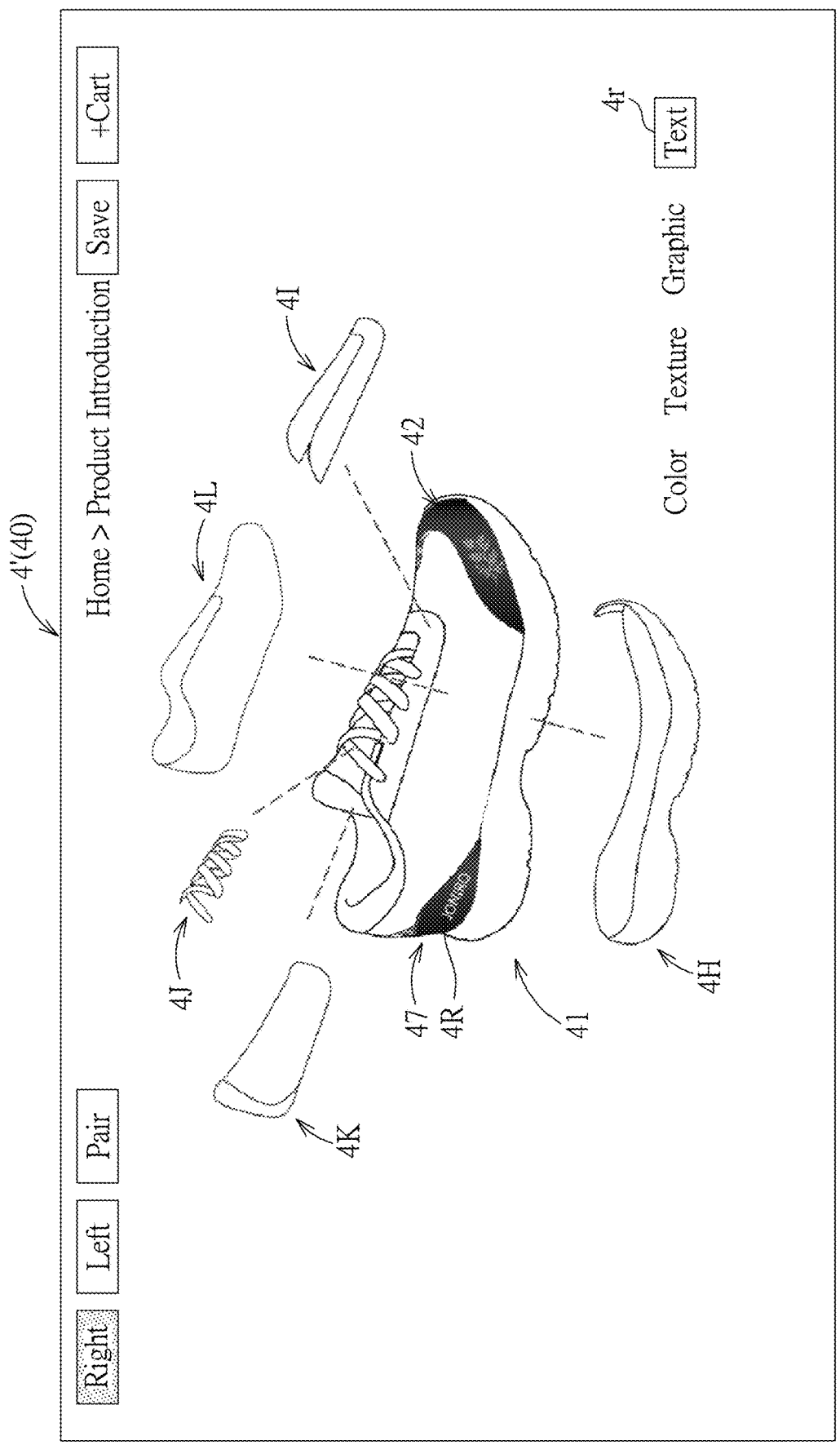
FIG. 12 is a schematic diagram of the interface unit having a text function according to the second embodiment of the present disclosure.

Please refer to FIG. 12, which is a schematic diagram of the interface unit 4' having a text function according to the second embodiment of the present disclosure. FIG. 12 is presented in grayscale. According to practical needs, the first part image 42 and the second part image 47 may be colorful. In a variation of the second embodiment, the interface unit 4' can further include a text edit button 4r (which is exemplarily illustrated as a "Text" button in FIG. 12) for the user 5 to select. In the embodiment, when the user 5 firstly selects a part image (such as one of the first part image 42, the second part image 47, the third part image 4H, the fourth part image 4I, the fifth part image 4J, the sixth part image 4K and the seventh part image 4L), then selects the text edit button 4r, such that the interface unit 4' would display a text editing area (not shown) for the user 5 to type and generate a text 4R. Sequentially, the text 4R is displayed on the selected part image (as an exemplification in FIG. 12, the text 4R is displayed on the second part image 47).

Figure 13:
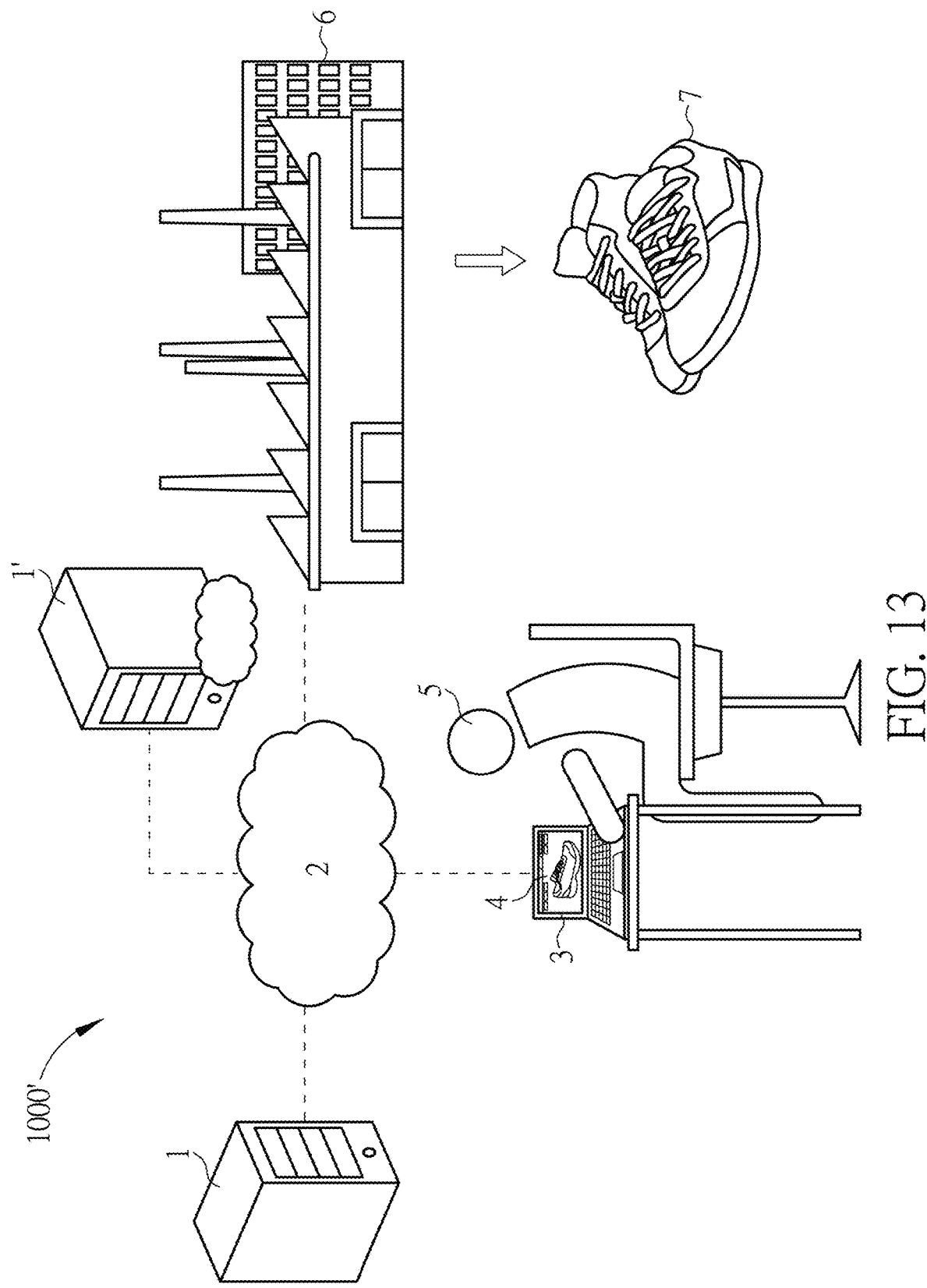
FIG. 13 is a schematic diagram showing an intuitive customization system according to a third embodiment of the present disclosure.

Please refer to FIG. 13, which is a schematic diagram showing an intuitive customization system 1000' according to a third embodiment of the present disclosure. The difference between the third embodiment and the first embodiment is that the intuitive customization system 1000' can further include Y authorized patterns (not shown) for the user 5 to choose, wherein Y is a positive integer. The Y authorized patterns may be obtained by the server unit 1 from an external server 1' via the internet 2, or may be loaded into the server unit 1 by an administrator. In this embodiment, the first customized pattern represents one of the P first patterns, and further represents another one of the P first patterns, one of the Y authorized patterns or a combination thereof. Details of the authorized patterns are recited above and are omitted herein.

Figure 14:
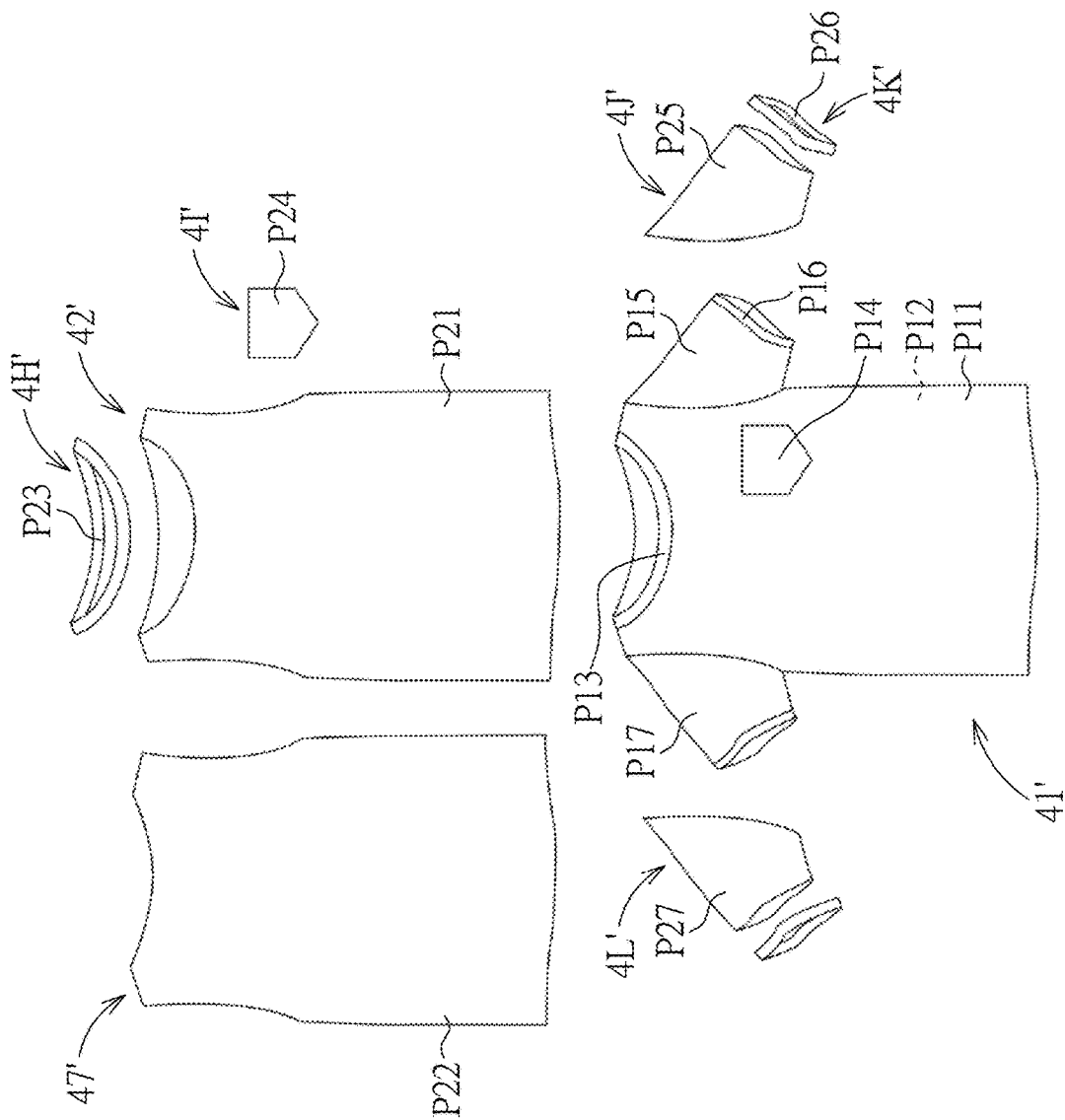
FIG. 14 is a schematic diagram showing a portion of an interface unit according to a fourth embodiment of the present disclosure.

Please refer to FIG. 14, which is a schematic diagram showing a portion of an interface unit 4 according to a fourth embodiment of the present disclosure. The difference between the fourth embodiment and the first embodiment is that the intuitive customization system 1000 is for designing a garment. Therefore, in this embodiment, the first base image 41' represents an outline of a garment. The interface unit 4 includes a first part image 42', a second part image 47', a third part image 4H', a fourth part image 4I', a fifth part image 4J', a sixth part image 4K' and a seventh part image 4L'. Each of the first part image 42', the second part image 47', the third part image 4H', the fourth part image 4I', the fifth part image 4J', the sixth part image 4K' and the seventh part image 4L' represents one of garment parts of the garment. Similarly, the first part image 42' is displayed at the first position P11 or at the second position P21. The second part image 47' is displayed at the first position P12 or at the second position P22. The third part image 4H' is displayed at the first position P13 or at the second position P23. The fourth part image 4I' is displayed at the first position P14 or at the second position P24. The fifth part image 4J' is displayed at the first position P15 or at the second position P25. The sixth part image 4K' is displayed at the first position P16 or at the second position P26. The seventh part image 4L' is displayed at the first position P17 or at the second position P27. The customization procedure of the garment is similar to that of the shoe, which is not repeated for the sake of conciseness.

Figure 15:
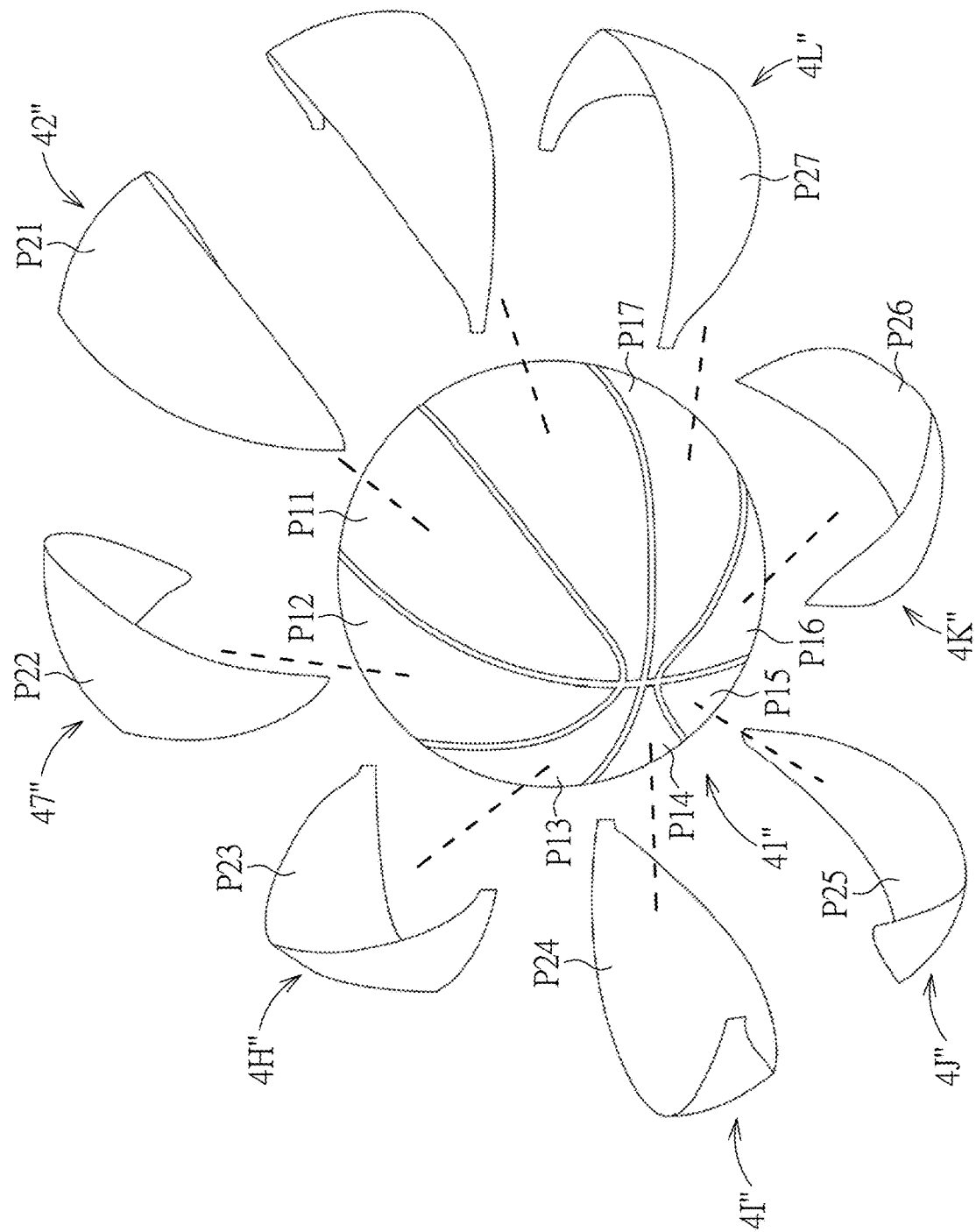
FIG. 15 is a schematic diagram showing a portion of an interface unit according to a fifth embodiment of the present disclosure.

Please refer to FIG. 15, which is a schematic diagram showing a portion of an interface unit 4 according to a fifth embodiment of the present disclosure. The difference between the fifth embodiment and the first embodiment is that the intuitive customization system 1000 is for designing a ball. Therefore, in this embodiment, the first base image 41' represents an outline of a ball. The interface unit 4 includes a first part image 42", a second part image 47", a third part image 4H", a fourth part image 4I", a fifth part image 4J", a sixth part image 4K" and a seventh part image 4L". Each of the first part image 42", the second part image 47", the third part image 4H", the fourth part image 4I", the fifth part image 4J", the sixth part image 4K" and the seventh part image 4L" represents one of sheet-like portions of the ball. Similarly, the first part image 42" is displayed at the first position P11 or at the second position P21. The second part image 47" is displayed at the first position P12 or at the second position P22. The third part image 4H" is displayed at the first position P13 or at the second position P23. The fourth part image 4I" is displayed at the first position P14 or at the second position P24. The fifth part image 4J" is displayed at the first position P15 or at the second position P25. The sixth part image 4K" is displayed at the first position P16 or at the second position P26. The seventh part image 4L" is displayed at the first position P17 or at the second position P27. The customization procedure of the ball is similar to that of the shoe, which is not repeated for the sake of conciseness.

Comprehensibly, in addition to customize the aforementioned shoes, garments, and balls, the present disclosure can also be applied to customize sport-related goods, such as hats, packs, bags, bicycle seat cushions, and so on.

Compared to the prior art, the present disclosure has features as follow. The interface unit provides a first base image, a first part image and a first pattern menu. First positions are defined within the first base image, second positions are defined outside the first base image, and the first part image is selectively displayed at one of the first positions or at one of the second positions. The first pattern menu is provided for the user to select a first pattern so as to generate a first customized pattern. The first customized pattern represents the first pattern. In this way, the user can conveniently design customized products through the interface unit. Accordingly, an easy-to-use customization system is provided to the consumers.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An intuitive customization system, comprising:
   a server unit signally connected to an internet;
   a display device signally connected to the server unit;
   an interface unit displayed on the display device, the interface unit comprising:
     a working window frame;
     a first base image displayed in the working window frame, N first positions being defined within the first base image, M second positions being defined outside the first base image, wherein N is a positive integer, and M is a positive integer;
     a first part image displayed at one of the N first positions or at one of the M second positions, wherein the one of the N first positions corresponds to the one of the M second positions;
     a first pattern menu selectively displayed in the working window frame, wherein the first pattern menu comprises P first patterns, P is a positive integer, when a user selects one of the P first patterns of the first pattern menu, the first part image displays a first customized pattern, the first customized pattern represents the one of the P first patterns; and a function image displayed in the working window frame for being selected by the user, wherein when the user selects the function image, the server unit receives a first user design, the first user design comprises the first base image, the first part image and the first customized pattern; and a manufacturing station signally connected to the internet, wherein the manufacturing station receives the first user design from the server unit and manufactures a finished product according to the first user design;

wherein the first part image is capable of being selected by the user, when the first part image is initially located at the one of the N first positions, and the first part image is selected, the first part image moves from the one of the N first positions to the one of the M second positions, or when the first part image is initially located at the one of the M second positions, and the one of the P first patterns of the first pattern menu is selected, the first part image moves from the one of the M second positions to the one of the N first positions.

2. The intuitive customization system of claim 1, wherein when the first part image is selected, the first pattern menu is displayed in the working window frame; when the first part image is not selected, the first pattern menu is not displayed in the working window frame.

3. The intuitive customization system of claim 1, wherein at least one of the first base image and the first part image is a three-dimensional computer graphic.

4. The intuitive customization system of claim 1, wherein the first part image is initially located at the one of the N first positions, when the user clicks an area outside the first base image, the first part image, the first pattern menu and the function image, the first part image moves from the one of the N first positions to the one of the M second positions.

5. The intuitive customization system of claim 1, wherein the P first patterns are texture patterns, color patterns, graphic patterns or a combination thereof.

6. The intuitive customization system of claim 5, wherein the first part image initially has a first preset pattern, the first preset pattern represents a texture pattern, a color pattern or a graphic pattern, wherein:

when the user selects one of the texture patterns or one of the color patterns of the P first patterns of the first pattern menu, the first preset pattern is replaced by the first customized pattern corresponding to the one of the texture patterns or the one of the color patterns being selected, such that the first customized pattern represents the one of the texture patterns or the one of the color patterns;

when the user selects one of the graphic patterns of the P first patterns of the first pattern menu, the first customized pattern is generated by the one of the graphic patterns being selected and the first preset pattern, wherein the first customized pattern represents the one of the graphic patterns being selected and the first preset pattern at the same time.

7. The intuitive customization system of claim 6, wherein the first preset pattern is obtained by the user selecting one of the P first patterns of the first pattern menu, and the first preset pattern represents the one of the P first patterns.

8. The intuitive customization system of claim 1, wherein the first user design further comprises a text, the text is located within the first base image.

9. The intuitive customization system of claim 8, wherein the text is displayed at one of the N first positions.

10. The intuitive customization system of claim 1, wherein:

the interface unit further comprises a second part image, the second part image is displayed at another one of the N first positions or at another one of the M second positions in the working window frame, the another one of the N first positions corresponds to the another one of the M second positions;

the interface unit further comprises a second pattern menu, the second pattern menu comprises Q second patterns, Q is a positive integer, when the user selects one of the Q second patterns of the second pattern menu, the second part image displays a second customized pattern, the second customized pattern represents the one of the Q second patterns;

the first user design further comprises the second part image and the second customized pattern.

11. The intuitive customization system of claim 1, wherein the first base image at least represents an outline of a shoe, the first part image represents one of shoe parts of the shoe, the shoe is one of a left shoe and a right shoe, when the server unit receives the first user design, the server unit mirrors the first user design to obtain the other one of the left shoe and the right shoe.

12. The intuitive customization system of claim 1, wherein the first base image at least represents an outline of a shoe, the first part image represents one of shoe parts of the shoe, the shoe is one of a left shoe and a right shoe, the interface unit further comprises:

a second base image displayed in the working window frame, further R first positions being defined within the second base image, further S second positions being defined outside the second base image, wherein R is a positive integer, and S is a positive integer; and another first part image displayed at one of the R first positions or at one of the S second positions, wherein the one of the R first positions corresponds to the one of the S second positions;

wherein when the user selects another one of the P first patterns of the first pattern menu, the another first part image displays another first customized pattern, the another first customized pattern represents the another one of the P first patterns;

wherein when the user selects the function image, the server unit receives a second user design, the second user design comprises the second base image and the another first customized pattern;

wherein the manufacturing station receives the second user design from the server unit, the manufacturing station manufactures one of the left shoe and the right shoe according to the first user design, and manufactures the other one of the left shoe and the right shoe according to the second user design.

13. The intuitive customization system of claim 1, wherein the first base image at least represents an outline of a garment, and the first part image represents one of garment parts of the garment.

14. The intuitive customization system of claim 1, wherein the first base image at least represents an outline of a ball, and the first part image represents one of sheet-like portions of the ball.

15. The intuitive customization system of claim 1, further comprises Y authorized patterns, Y is a positive integer, the Y authorized patterns are obtained by the server unit from an external server via the internet, the first customized pattern further represents another one of the P first patterns, one of the Y authorized patterns or a combination thereof.

16. The intuitive customization system of claim 1, wherein at least one of the P first patterns is an authorized pattern.

\* \* \* \* \*